United States Patent [19]
Freedman et al.

[11] Patent Number: 5,945,999
[45] Date of Patent: Aug. 31, 1999

[54] ANIMATION METHODS, SYSTEMS, AND PROGRAM PRODUCTS FOR COMBINING TWO AND THREE DIMENSIONAL OBJECTS

[75] Inventors: Darryl Freedman, Chapel Hill, N.C.; Jeffrey Freedman, Baltimore, Md.

[73] Assignee: Viva Associates, Chapel Hill, N.C.

[21] Appl. No.: 08/744,789

[22] Filed: Oct. 31, 1996

[51] Int. Cl.$^6$ .................................................. G06F 15/00
[52] U.S. Cl. ............................................................ 345/435
[58] Field of Search .................................... 345/473, 474, 345/475, 435, 113, 114

[56] References Cited

U.S. PATENT DOCUMENTS

| | | | |
|---|---|---|---|
| 4,884,972 | 12/1989 | Gasper | 434/185 |
| 5,261,041 | 11/1993 | Susman | 395/152 |
| 5,347,306 | 9/1994 | Nitta | 348/15 |
| 5,416,899 | 5/1995 | Poggio et al. | 395/152 |
| 5,469,536 | 11/1995 | Blank | 395/131 |
| 5,546,530 | 8/1996 | Grimaud et al. | 395/163 |

*Primary Examiner*—Phu K. Nguyen
*Attorney, Agent, or Firm*—Myers Bigel Sibley & Sajovec

[57] ABSTRACT

Composite graphic objects are generated and animated by representing two and three dimensional portions of the composite graphic object in a graphics processor. In particular, the three dimensional portion is defined in three dimensional space so that different views of the three dimensional portion can be displayed from different angles, and the two dimensional portion is defined in two dimensional space so that only one view of the two-dimension portion can be displayed. The three dimensional portion and the two dimensional portion are combined in the graphics processor to form the composite graphic object. A first view of the composite graphic object is then displayed on a two dimensional display wherein the three dimensional portion is displayed from a first angle. A second view of the composite graphic object can then be displayed on the two dimensional display wherein the three dimensional portion is displayed from a second angle and wherein movement of the three dimensional portion is transferred to the two dimensional portion.

54 Claims, 6 Drawing Sheets

ANIMATION METHODS, SYSTEMS, AND PROGRAM PRODUCTS FOR COMBINING TWO AND THREE DIMENSIONAL OBJECTS

FIELD OF THE INVENTION

The present invention relates to graphics displaying methods, systems, and products and more particularly to animation methods, systems, and products.

BACKGROUND OF THE INVENTION

Computer graphics techniques wherein graphic objects are generated in a graphics processor and rendered on a computer display are known in the art. More particularly, computer systems and methods have been developed to generate three dimensional objects defined in three dimensional space so that views of three dimensional objects from different viewing angles can be rendered on a two dimensional computer display. Techniques for projecting three dimensional objects onto a view plane are discussed, for example, in Section 1.4 of *Fundamentals of Three Dimensional Computer Graphics* by Alan Watt, Addison-Wesley Publishing Company, Reading, Mass., 1989. Moreover, computer graphic animation techniques can be used to generate and render three dimensional objects on a two dimensional viewing screen wherein the three dimensional objects appear to move in three-dimensions.

The animation techniques discussed above may lack a desired level of realism. In response, techniques have been developed to map a two dimensional image such as a photograph onto a three dimensional surface. The two dimensional image may be distorted, however, when mapped onto the three dimensional surface thus reducing the realism of the images generated thereby.

Accordingly, there continues to exist a need in the art for improved computer methods, systems, and program products which can generate and render realistic images which can move in three dimensional space.

SUMMARY OF THE INVENTION

It is therefor an object of the present invention to provide improved computer graphics methods, systems, and program products.

It is another object of the present invention to provide computer graphics methods, systems, and program products which generate and render realistic three dimensional objects on two dimensional displays.

It is still another object of the present invention to provide computer graphics methods, systems, and program products which generate realistic three dimensional animated objects.

These and other objects according to the present invention are provided by computer methods, systems, and program products which represent three dimensional and two dimensional portions of a graphic object in a graphics processor, combine the three dimensional and two dimensional portions to form a composite graphic object having three dimensional and two dimensional portions, and display the composite graphic object on a two dimensional display. Accordingly, the three dimensional portion of the composite graphic object can be displayed from different angles while the two dimensional portion is maintained parallel to the view screen. For example, a photograph of a person's head can be scanned into a computer to generate a two dimensional bitmap which can be combined with a three dimensional body generated by the computer to create a display having improved realism.

Furthermore, the two dimensional and three dimensional portions may be combined by defining a first three dimensional attachment region on the three dimensional portion, and defining a first two dimensional attachment line on the two dimensional portion. A three dimensional transition portion can then be generated wherein the transition portion includes a second three dimensional attachment region corresponding to the first three dimensional attachment region and a second two dimensional attachment line corresponding to the first two dimensional attachment line. Accordingly, the three dimensional portion and the transition portion can be combined along the corresponding first and second three dimensional attachment regions, and the two dimensional portion and the transition portion can be combined along the corresponding first and second two dimensional attachment lines. The transition region can thus be recomputed when the three dimensional portion moves in order to maintain a realistic connection between the two and three dimensional portions.

In particular, the first and second three dimensional attachment regions can be corresponding polygons, and the first and second two dimensional attachment lines can be linear. Furthermore, the first two dimensional attachment line can define a boundary for a transition region of the two dimensional portion and pixels from the two dimensional transition region can be mapped onto the three dimensional transition portion. Accordingly, the transition portion will match the two dimensional portion. For example, the three dimensional portion can be a human body up to a shirt collar, the two dimensional portion can be a photograph of a human head, and the transition portion can be the neck connecting the human body at the collar to the head.

Moreover, pixels from a neck region of the photograph can be mapped onto the transition portion to enhance the realism. In particular, the three dimensional transition portion can be divided into a first plurality of polygons, and the two dimensional transition portion can be divided into a second plurality of polygons corresponding to the first plurality of polygons, and pixels from each of the second plurality of polygons can be mapped onto respective ones of the first plurality of polygons.

In addition, the composite graphic object can be animated by displaying a first and second view thereof. In the first view, the three dimensional portion of the composite graphic object is displayed from a first angle, and in the second view, the three dimensional portion displayed from a second angle. In each view, movement of the three dimensional portion is transferred to the two dimensional portion while maintaining the two dimensional portion parallel to the view screen.

The computer methods, systems, and program products of the present invention can thus provide realistic composite graphic objects including two dimensional and three dimensional portions. Accordingly, a computer generated character can have an animated three dimensional body together with a two dimensional head from a photograph or video image to enhance realism. Furthermore, motion of the body can be transferred to the head while maintaining a realistic connection therebetween.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to the present invention, an animated composite graphic object can be generated by a graphics processor of a computer system and rendered on a display of the computer system. In particular, the present invention can be implemented as a computer program which runs on a standard personal computer such as a Windows® compatible Personal Computer or an Apple® Macintosh® system. This system will only be described briefly because it is well known to those having skill in the art.

Similarly, the present invention utilizes, in part, many standard graphics techniques for animating three dimensional characters and for generating a graphics display. These techniques are described in detail in the following references: *Photorealism and Ray Tracing* in C by Watkins et al., M&T Books, San Mateo, Calif. (ISBN 1-55851-247-0), 1992; *Fundamentals of Interactive Computer Graphics* by J. D. Foley et al., Addison-Wesley Publishing Company, Reading Mass., 1983; *Fundamentals of Three dimensional Computer Graphics* by Alan Watt, Addison-Wesley Publishing Company, Reading Mass., 1989; *Computer Graphics, Principles and Practice* by J. D. Foley et al., Addison-Wesley Publishing Company, Reading, Mass., (Second Edition), 1990; and *OpenGL Programming Guide* by Neider et al., Addison-Wesley Publishing Company, Reading, Mass., 1993. The disclosure of each of these references is hereby incorporated herein in its entirety by reference. As the standard graphics techniques are discussed in detail in the above mentioned references, the present description will concentrate on the generating, combining, and displaying operations of the present invention.

Figure 1:
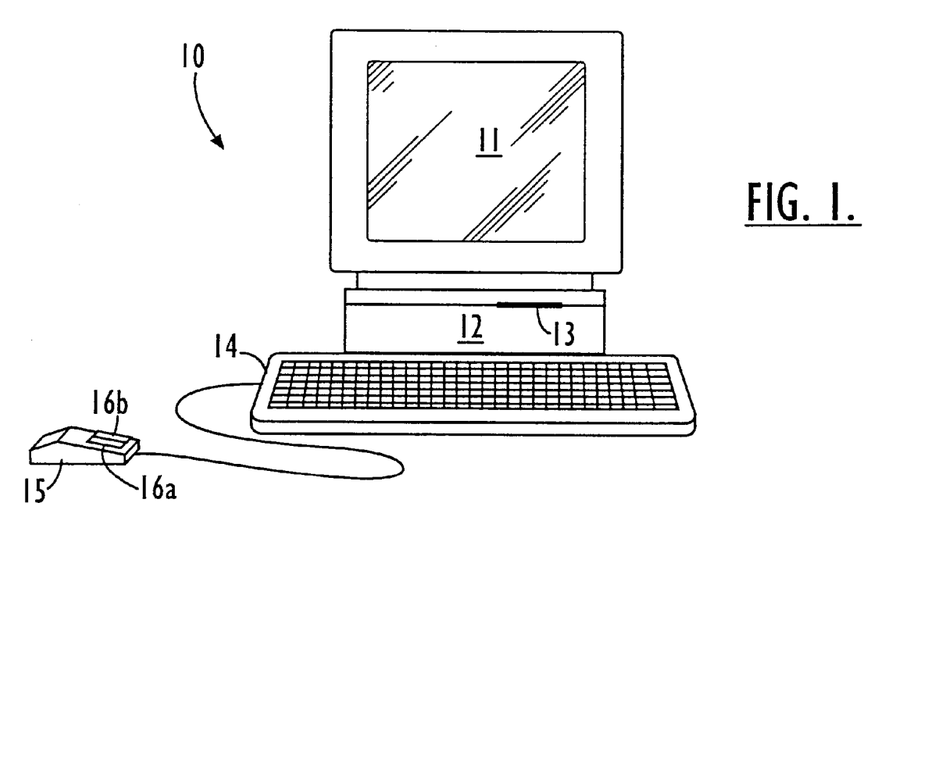
FIG. 1 illustrates a computer system on which the present invention may be practiced.

The invention may be used on any computer, and while it may be preferred to use a color monitor as the display, a black and white monitor can alternately be used. In particular, the invention can be used on personal computers. Referring to FIG. 1, the computer system 10 includes a display 11, preferably a high resolution color graphics monitor, and a central processing unit 12. The central processing unit includes a microprocessor and random access memory for storing programs therein for processing by the microprocessor. A disk drive 13 for loading programs may also be provided. A keyboard 14 having a plurality of keys thereon is connected to the central processing unit 12, and a pointing device such as a mouse 15 may also be connected to the central processing unit 12. As shown, the mouse 15 can include a pair of selection keys 16a and 16b.

Figure 2:
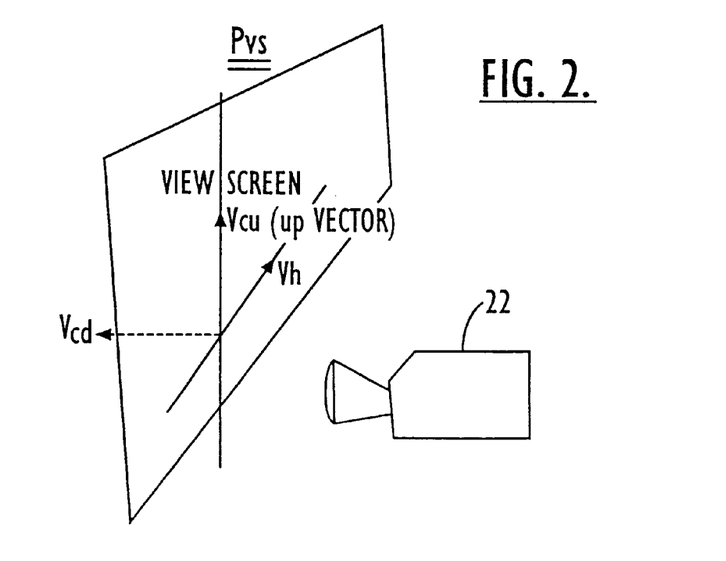
FIG. 2 illustrates a view screen with associated vectors defining the orientation of a virtual camera according to the present invention.

The composite graphic objects of the present invention will be generated by a graphics processor in the central processing unit 12 of the computer system 10 of FIG. 1, and displayed on the display 11. Referring to FIG. 2, the graphic objects will be generated and displayed with respect to a virtual camera 22 having an orientation defined by three vectors. The vector Vcd defines the direction that the virtual camera is pointing, the orthogonal vector Vcu defines the up direction relative to the virtual camera, and the orthogonal vector Vh defines the horizontal direction relative to the virtual camera. Accordingly, the view screen Pvs can be coincident with the screen of the display 11, and the graphic objects of the present invention will be defined with reference to the view screen Pvs and the related vectors Vcd, Vcu, and Vh.

Figure 3:
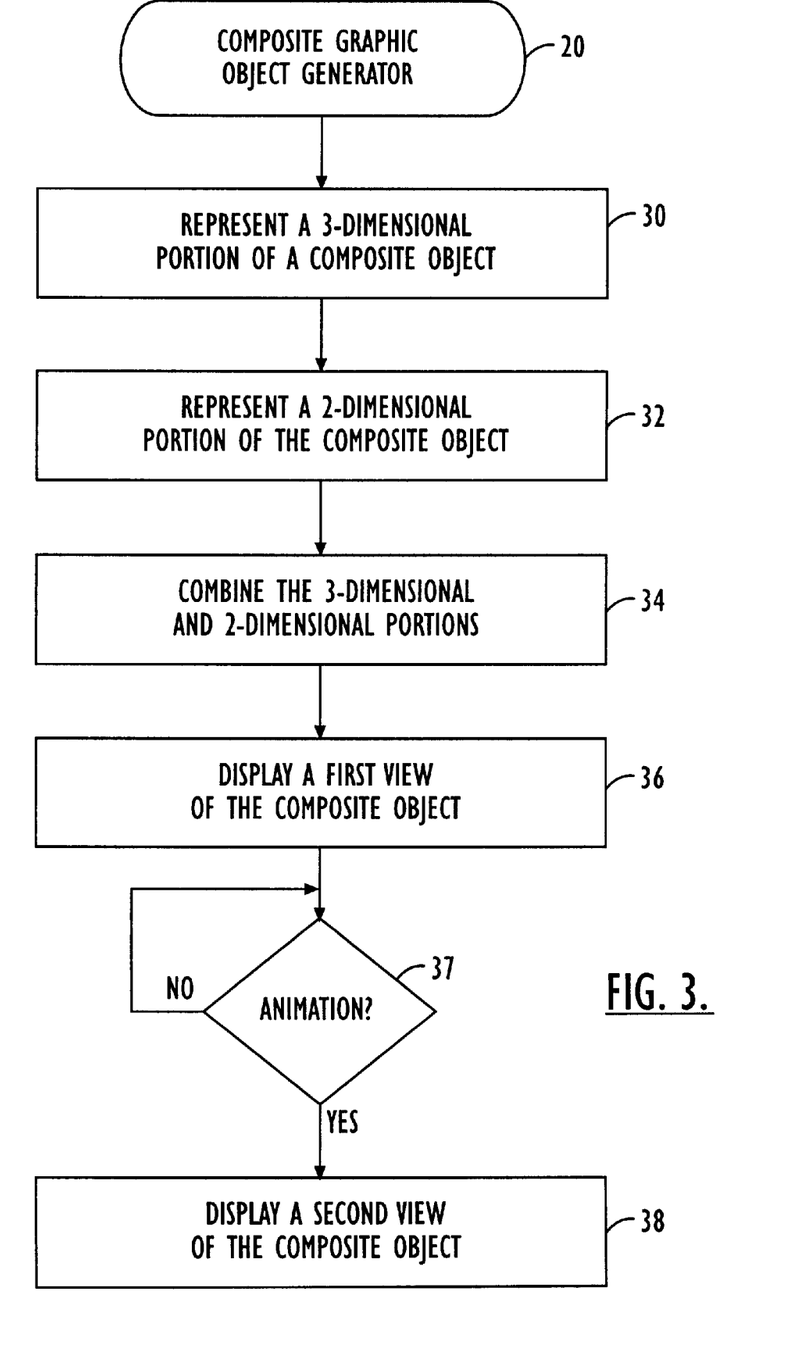
FIG. 3 illustrates a flow chart including operations for generating graphic objects including two and three dimensional portions according to the present invention.
Figure 4:
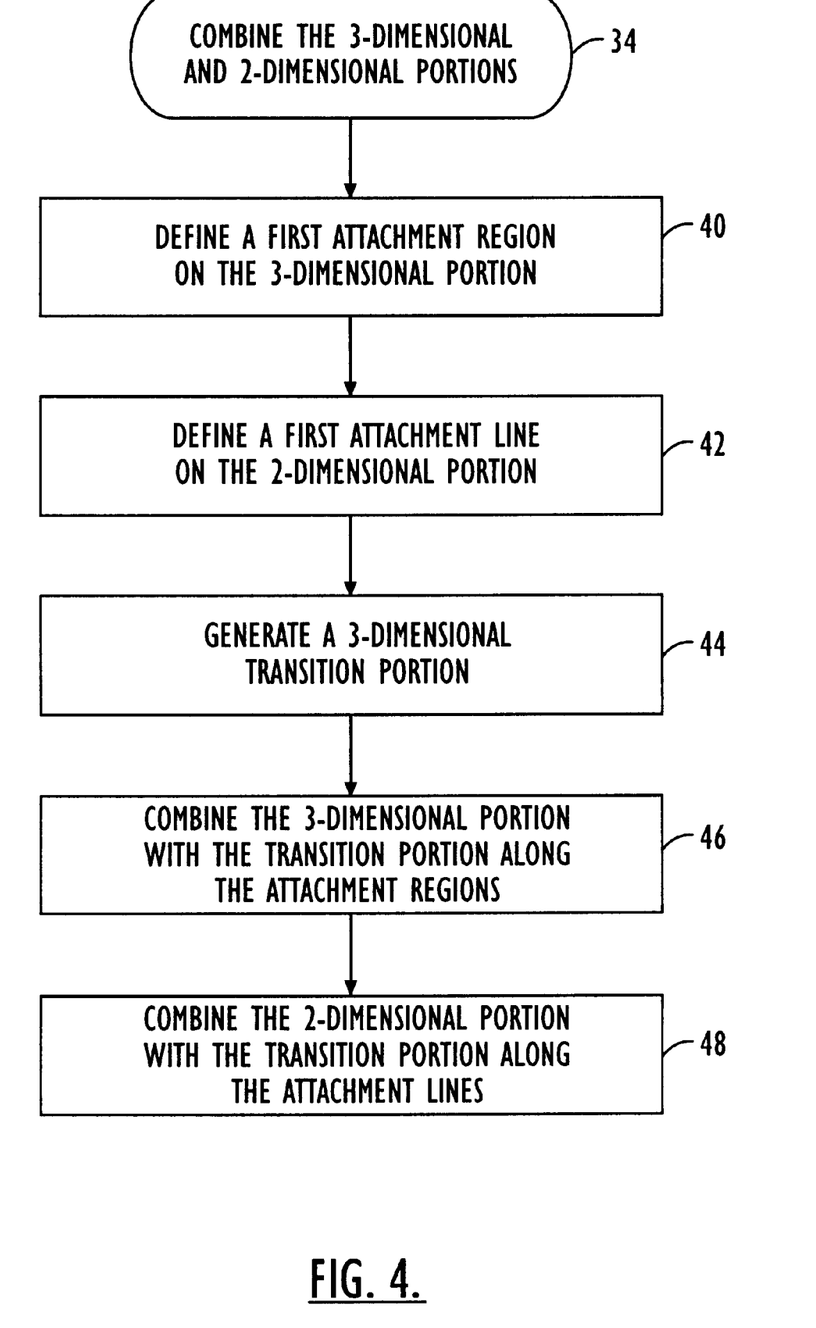
FIG. 4 illustrates a flow chart including operations for combining the two and three dimensional portions according to the present invention.

Two and three dimensional graphic objects can be combined according to the present invention to generate a composite graphic object wherein a portion of the composite object is two dimensional and another portion of the graphic object is three dimensional. In particular, FIGS. 3 and 4 are flowchart illustrations of graphic methods, systems, and program products according to the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 5:
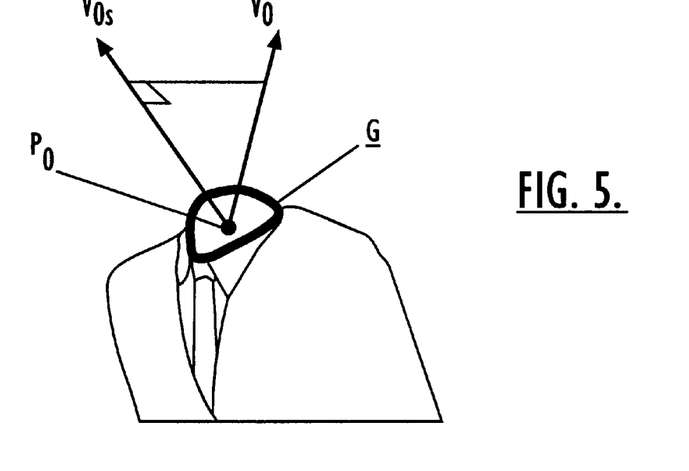
FIG. 5 illustrates a three dimensional portion of a graphic object according to the flow chart of FIG. 3.
Figure 6:
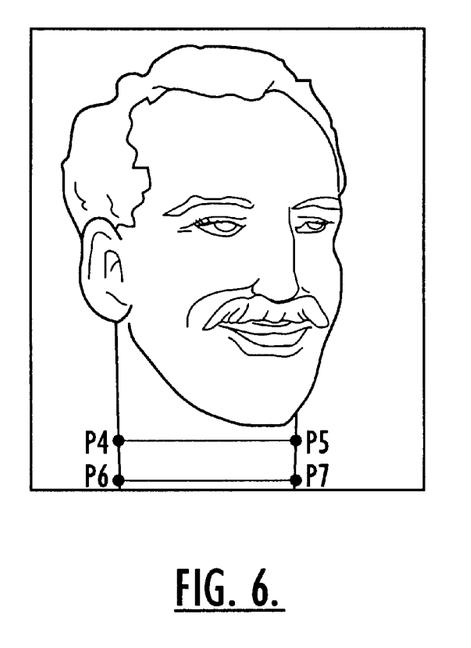
FIG. 6 illustrates a two dimensional portion of a graphic object according to the flow chart of FIG. 3.

Referring now to FIG. 3, operations for a composite Graphic Object Generator (Block 20) will now be described. A three dimensional portion of the graphic object can be represented in the graphics processor at block 30, and a two dimensional portion of the graphic object can be represented in the graphics processor at block 32. More particularly, the three dimensional portion can be defined in three dimensional space so that different views of the three dimensional portion can be displayed from different angles. The two dimensional portion can be defined in two dimensional space so that one view of the two dimensional portion can be displayed. An example of a three dimensional portion which can be represented in the graphics processor is illustrated in FIG. 5, and an example of a two dimensional portion which can be represented in the graphics processor is illustrated in FIG. 6. In FIG. 5, a three dimensional headless human body is shown, and in FIG. 6, a two dimensional head is shown. The human body of FIG. 5 can be moved in three dimensional space while the two dimensional head of FIG. 6, which can be represented as a bit map, is oriented on a plane Pvsp parallel to the view screen Pvs.

The three dimensional portion and the two dimensional portion can be combined in the graphics processor at block 34 to form the composite graphic object. A first view of the composite graphic object can then be displayed on the computer display 11 at block 36, wherein the three dimensional portion of the graphic object is displayed from a first angle. In order to animate the composite object, multiple views of the composite object can be sequentially displayed at decision block 37. A second view of the composite graphic object can be displayed on the computer display 11 at block 38, wherein the three dimensional portion is displayed from a second angle and wherein movement of the three dimensional portion is transferred to the two dimensional portion.

Figure 10:
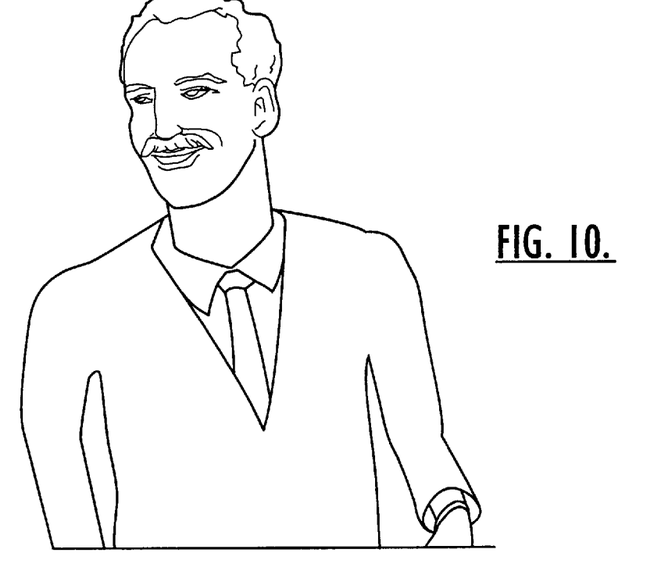
FIG. 10 illustrates a first representation of a graphic object including a three dimensional body portion, a three dimensional neck transition portion, and a two dimensional head portion generated according to the present invention.
Figure 11:
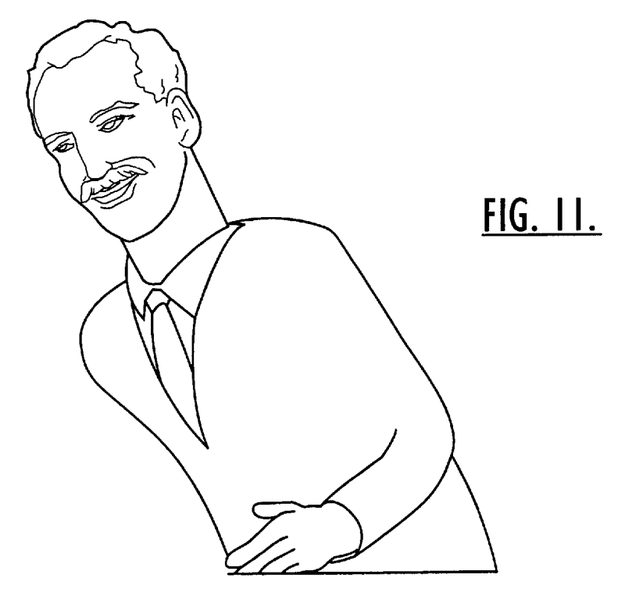
FIG. 11 illustrates a second representation of the graphic object of FIG. 10 wherein the three dimensional body portion has been rotated and tilted with motion thereof being transferred to the three dimensional neck transition portion and to the two dimensional head portion.

Examples of first and second views of a three dimensional graphic body combined with a two dimensional graphic head are illustrated in FIGS. 10 and 11. As shown in FIG. 10, the body is oriented toward the virtual camera with both arms visible, and the head is attached to the body. In FIG. 11, the body is rotated to the right and tilted forward so that the side of the left arm is visible, and the right arm is not visible. In FIG. 11, the head has been rotated to maintain its orientation and attachment relative to the shoulders. Because the head is provided as a two dimensional bitmap, the view of the head does not change.

Operations for combining the two dimensional and three dimensional portions to form the composite graphic object (Block 34 of FIG. 3) will now be discussed in greater detail with reference to the flow chart of FIG. 4. A first attachment region can be defined on the three dimensional portion at block 40. More particularly, the attachment region may comprise a polygon G made up of a plurality of line segments in three dimensional space, as shown in FIG. 5. The polygon G may define a portion of the three dimensional headless body to which the head will be attached. In addition, a first attachment line can be defined on the two dimensional portion at block 42. An attachment line is illustrated in FIG. 6 as the line between points P4 and P5 wherein portions of the bitmap above this line will be maintained as a two dimensional bitmap. As will be understood by those having skill in the art, the line between points P4 and P5 need not be straight but can be any continuous segment joining points P4 and P5.

Figure 9:
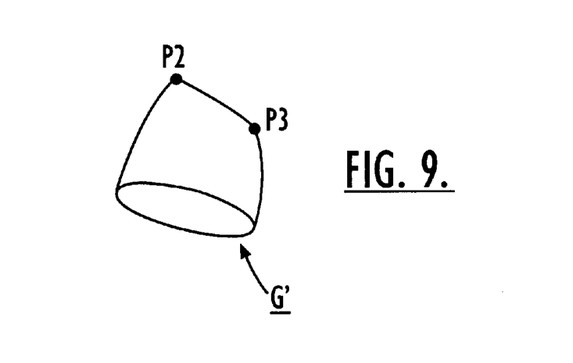
FIG. 9 illustrates a completed transition portion according to the flow chart of FIG. 4.

A three dimensional transition portion is then generated at block 44 of FIG. 5, wherein the transition portion includes a second attachment region corresponding to the first attachment region and a second attachment line corresponding to the first attachment line. An example of a transition portion is illustrated in FIG. 9 wherein the second attachment region comprises a polygon G' corresponding to the polygon G of FIG. 5. The transition portion of FIG. 9 also includes a second attachment line between the points P2 and P3 corresponding to the first attachment line of FIG. 6. Like the first attachment line, the second attachment line need not be straight but can be any continuous segment corresponding to the first attachment line.

The three dimensional portion and the transition portion are then combined along the corresponding first and second attachment regions at block 46, and the two dimensional portion and the transition portion are combined along the corresponding first and second attachment lines at block 48. The transition portion thus provides a smooth transition from the two dimensional head to the three dimensional body as shown in FIGS. 10 and 11. As further shown, the three dimensional body can move in three dimensional space while the two dimensional head is oriented in a plane parallel to the view screen. Accordingly, when the three dimensional portion (body) turns, the transition portion (neck) is recalculated so that the two dimensional portion (head) appears to turn so that its direction relative to the virtual camera remains the same. Accordingly, the attachment between a two dimensional head and a three dimensional body appears natural. For ease of understanding, the transition portion is discussed as being generated separately from the two and three dimensional portions. Those having skill in the art, however, will understand that the transition portion can be generated directly on the three dimensional portion, directly on the two dimensional portion, or directly on both the two and three dimensional portions. Accordingly, the first and second attachment lines can be considered as a single attachment line shared by the two dimensional portion and the transition portion. In addition, the first and second attachment regions can be considered as a single attachment region shared by the three dimensional portion and the transition portion.

The formation of the transition portion will now be discussed in greater detail with reference to FIGS. 5–9. The three dimensional portion can be a human body as shown in FIG. 5, and the attachment region can be defined by the polygon G thereon. This three dimensional body is defined by a plurality of points in three dimensional space so that it can be viewed from different angles. Furthermore, the three dimensional portion includes a point P0 which can be located in the polygon G. When the three dimensional portion is a human body, the point P0 can be a point about which the neck is to be centered. The vector V0 extends from the point P0 and sets the nominal direction of the transition portion (neck) and two dimensional portion (head) relative to the three dimensional portion (body). The two dimensional portion (head) will be drawn on a plane Pvsp which is parallel to the view screen and which passes through the point P0.

The two dimensional portion can be a human head, as shown in FIG. 6, to be attached to the body. This two dimensional head is preferably a digital bitmap which can be provided, for example, by scanning a photograph or providing a video image. The head can be isolated from the background of the photograph or video image by techniques such as color, luminance, or intensity keying. Methods for isolating an image from a background are discussed for example in U.S. Pat. No. 5,469,536 to Blank entitled "Image Editing System Including Masking Capability" the disclosure of which is hereby incorporated herein in its entirety by reference.

Once the two dimensional portion is isolated from the background, a portion thereof is designated as the transition region. As shown, the attachment line between points P4 and P5 separates the transition region from the rest of the two dimensional portion, and the line between points P6 and P7 defines a second boundary for the transition region. Image pixels from the transition region of the two dimensional portion are then mapped to the transition portion of FIG. 9 to provide a realistic transition between the two and three dimensional portions. When the three dimensional portion comprises a human body as shown in FIG. 5 and the two dimensional portion comprises a head as shown in FIG. 6, the transition portion can make up a neck as shown in FIG. 9 to join the head and the body. Accordingly, a neck region of the photograph can be designated as the transition region. As previously discussed, the attachment line between points P4 and P5 does not need to be straight but can be any continuous segment joining points P4 and P5. Similarly, the line between points P6 and P7 does not need to be straight but can be any continuous segment joining points P6 and P7.

The transition region of the two dimensional portion can be determined as a predetermined percentage of the isolated image, or the transition region can be determined manually. For example, it can be assumed that a neck constitutes a predetermined percentage of an image of a neck and a head. The percentage can then be varied based on user input. Alternately, the transition region can be determined manually by placing line segments across the portions of the image to be used as the transition region. The lines can be placed, for example, by using a pointing device such as the mouse 15 of FIG. 1. The transition region is thus defined as that portion of the two dimensional portion between the line segments defined by the points P4 and P5, and P6 and P7.

Figure 7:
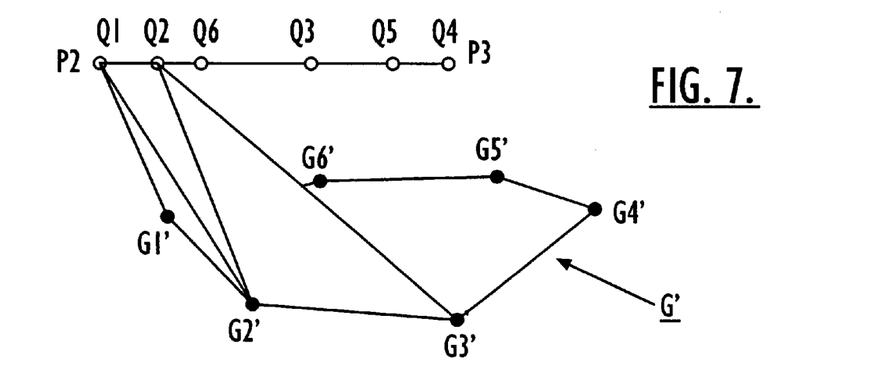
FIG. 7 illustrates a partially generated transition portion according to the flow chart of FIG. 4.

The shape of the transition portion is then determined by generating a plurality of polygons as shown in FIG. 7. The base of the transition portion comprises the polygon G' corresponding to the polygon G of the three dimensional portion. This polygon can include six line segments joined at six points G1 to G6. The top of the transition portion comprises a line between the points P2 and P3 corresponding to the attachment line between the points P4 and P5 of the two dimensional portion of FIG. 6.

The top line of the transition portion is generated with reference to the point P0, the vector V0, the neck length NL, the neck width NW, and the plane Pvsp parallel to the view screen which intersects the point P0. In order for the two dimensional portion to appear realistic, the direction vector V0 is projected onto a plane which passes through the origin and which is parallel to the plane Pvsp and the projected vector is normalized to generate the vector V0s shown in FIG. 5. The vector V0s can be calculated as follows:

$$V0s=(Vh \cdot V0)Vh+(Vcu \cdot V0)Vcu.$$

A center point P1 for the top line is calculated as follows:

$$P1=P0+(NL)V0s.$$

Accordingly, the point P1 is a distance NL (neck length) from the point P0 in the direction of the vector V0s.

The end points P2 and P3 for the top line of the transition object are then calculated with reference to the center point P1. A normalized vector V1 is calculated as follows:

$$V1=N(Vcd \times V0s),$$

wherein the function N() normalizes the result of the cross product. The vector V1 is thus parallel to the plane Pvps and perpendicular to the vector V0s. The end points P2 and P3 can then be calculated using the vector V1 and the center point P1. In particular, the point P2 is located a distance NW/2 from the point P1 in the direction of vector V1, and the point P3 is located a distance NW/2 from the point P1 in the direction opposite the vector V1. The points P2 and P3 can thus be calculated according to the following formulas:

$$P2=P1+V1(NW/2), \text{ and}$$

$$P3=P1-V1(NW/2),$$

where NW is the neck width. The top line of the transition portion is thus defined between the points P2 and P3 as shown in FIG. 7.

The top line and the polygon G' are then connected by a plurality of polygons such as triangles which define the outer surface of the three dimensional transition portion. First, a plurality of points Q1–Q6 are calculated along the top line corresponding to the points G1'–G6' of the polygon. The relative spacing of these points is calculated by projecting the points Gi' of the polygon G' onto a line which passes through the origin parallel to the vector V1. The distance Ni between each of these projected points and the origin is then calculated. These distances Ni are calculated by taking the dot product of Gi' with V1 as follows:

$$Ni=Gi' \cdot V1,$$

where Ni is the scalar dot product of Gi' and V1 for all vertices i=1–m.

These relative distances are then converted to fractional distances Mi to ease the selection of intermediate points Qi along the line segment between points P2 and P3. The fractional distances Mi are calculated as follows:

N$^+$=the largest value of Ni,

N$^-$=the least value of Ni,

L=N+−N$^-$, and

Mi=(Ni−N$^-$)/L, where Mi-Mm is a sequence of numbers between 0 and 1.

The points Qi along the line between points P2 and P3 are then calculated using the values Mi as follows:

$$Qi=MiP2+(1-Mi)P3, \text{ for } i=1-m.$$

The points Qi are thus spaced so as to have the same relative spacings as the points Ni, as shown in FIG. 7. The transition object can then be formed from a plurality of polygons, such as triangles, which connect the polygon G' and the top line defined by the points P2 and P3. More particularly, a series of triangles Ai and Bi can be provided as follows:

Ai={Gi', Gni', Qi}, and

Bi={Qi, Qni, Gni'}, where ni=i+1 for i<m, and ni=1 for i=m

The following triangles will thus be formed to connect the polygon G' and the top line of FIG. 7.

$$A1 = \begin{Bmatrix} G1', & G2', & Q1 \\ G2', & G3', & Q2 \\ G3', & G4', & Q3 \\ G4', & G5', & Q4 \\ G5', & G6', & Q5 \\ G6', & G1', & Q6 \end{Bmatrix} \quad B1 = \begin{pmatrix} Q1, & Q2, & G2' \\ Q2, & Q3, & G3' \\ Q3, & Q4, & G4' \\ Q4, & Q5, & G5' \\ Q5, & Q6, & G6' \\ Q6, & Q1, & G1' \end{pmatrix}$$
$$A2 = \\ A3 = \\ A4 = \\ A5 = \\ A6 =$$

Alternate arrangements of triangles and arrangements of other polygons to define the shape of the transition portion can be constructed as will be understood by one having skill in the art.

Figure 8:
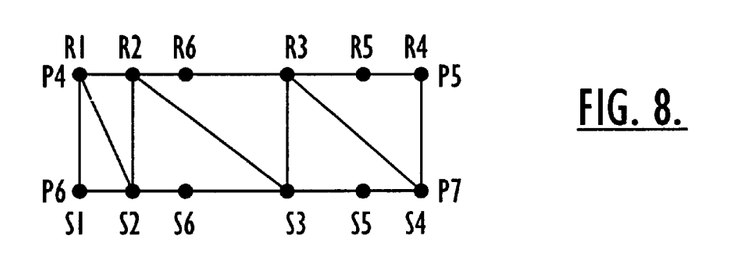
FIG. 8 illustrates the division of a transition region of the two dimensional portion of FIG. 6.

A corresponding array of polygons are formed on the transition region of the two dimensional portion to facilitate the mapping of pixels from the two dimensional transition region to the three dimensional transition portion. An enlarged view of the transition region between the line defined by the points P4 and P5 defining the top of the neck, and the line defined by the points P6 and P7 defining the bottom of the neck is illustrated in FIG. 8. As shown, the points Ri are defined along the top line, and the points Si are defined along the bottom line. The points Ri and Si are spaced along the respective lines using the same ratios Mi discussed above with regard to the spacing of the points Qi.

Polygons such as triangles Ci and Di are then calculated to connect the two lines using the same technique discussed above with regard to the transition portion. More particularly, these points can be calculated as follows:

Ri=MiP4+(1−Mi)P5, and

Si=MiP6+(1−Mi)P7.

Furthermore the triangles can be calculated as follows:

Ci={Ri, Rni, Sni}, and

Di={Si, Sni, Ri}, where ni=i+1 for i<m, and ni=1 for i=m.

As shown in FIG. 8, the following triangles will thus be defined:

$$C1 = \begin{Bmatrix} R1, & R2, & S2 \\ R2, & R3, & S3 \\ R3, & R4, & S4 \end{Bmatrix} \quad D1 = \begin{Bmatrix} S1, & S2, & R1 \\ S2, & S3, & R2 \\ S3, & S4, & R3 \end{Bmatrix}$$
$$C2 = \\ C3 =$$

The triangles C1, C2, and C3 thus respectively correspond to triangles B1, B2, and B3, and the triangles D1, D2, and D3 respectively correspond to triangles A1, A2, and A3.

The pixels making up the image on triangles C1, C2, C3, D1, D2, and D3 are thus respectively mapped to the triangles B1, B2, B3, A1, A2, and A3 making up the visible portion of the three dimensional transition portion. Mapping techniques are discussed, for example, in Section 16.7 ("Surface Detail") of *Fundamentals of Interactive Computer Graphics* by J. D. Foley et al., Addison-Wesley Publishing Company, Reading, Mass., 1989; in *OpenGL Programming Guide* by Neider et al., pp. 255–290, Addison-Wesley Publishing Company, Reading, Mass., 1993; and in *Photorealism and Ray Tracing* in C by Watkins et al., pp. 254–256, M&T Books, San Mateo, Calif. (ISBN 1-55851-247-0), 1992. An example of a transition portion thus formed is illustrated in FIG. 9.

The transition portion is thus connected to the three dimensional portion at the attachment region which can be made up of a polygon, and the transition portion includes a line between points P2 and P3 which lie in the plane Pvsp parallel to the view screen. The two dimensional bitmap making up the head of FIG. 6 is scaled to match the three dimensional body and the transition portion. In particular, the portion of the head below the line between the points P4 and P5 is discarded, and the portion of the head above this line is scaled both horizontally and vertically by the ratio of the neck width (NW) to the length of the line between the points P4 and P5.

The two dimensional portion can thus be connected to the transition portion by connecting point P4 to point P2 and by connecting the point P5 to the point P3. Furthermore, the two dimensional portion is oriented in the plane Pvsp which is parallel to the view screen. As shown in the figures, a two dimensional head can be connected to a three dimensional body using a three dimensional transition portion including an attachment line which is maintained parallel to the view screen. More particularly, by mapping the two dimensional image of a neck onto the three dimensional transition portion, the composite image can be made more realistic. The two dimensional head can be provided as a still image. Alternately, the two dimensional head can be provided as video allowing the image of the head to change.

The composite graphic objects generated according to the operations discussed above can be animated by displaying a plurality of views of the three dimensional portion, wherein each view is displayed from a slightly different angle to create the appearance of movement. As the three dimensional portion moves, the attachment region (polygon G) and the direction vector V0 also move. Accordingly, for each view, the two dimensional portion is repositioned in response to movement of the three dimensional portion. Furthermore, the transition portion can be recomputed for each view to maintain a realistic connection between the two and three dimensional portions. The two dimensional portion, however, will be parallel to the view screen in each view.

The methods, systems, and program products of the present invention thus allow the attachment of a two dimensional image to a three dimensional animated object. The two dimensional image is maintained in proper orientation with respect to the three dimensional object as it moves so that movement of the three dimensional object is transferred to the two dimensional image. An animated character can thus be provided with the head of an actual person enhancing the realism of computer generated animation.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A graphics display method for animating a composite graphic object, said graphics display method comprising the steps of:

representing in a graphics processor, a three dimensional portion of said composite graphic object wherein said three dimensional portion is defined in three dimensional space so that different views of said three dimensional portion can be displayed from different angles;

representing in said graphics processor, a two dimensional portion of said composite graphic object wherein said two dimensional portion is defined in two dimensional space so that only one view of said two-dimension portion can be displayed;

combining in said graphics processor, said three dimensional portion and said two dimensional portion to form said composite graphic object;

displaying a first view of said composite graphic object on a two dimensional display wherein said three dimensional portion is displayed from a first angle; and displaying a second view of said composite graphic object on said two dimensional display wherein said three dimensional portion is displayed from a second angle and wherein movement of said three dimensional portion is transferred to said two dimensional portion such that movement of said two dimensional portion mimics movement of said three dimensional portion.

2. A graphics display method according to claim 1 wherein said combining step comprises:

defining a first attachment region on said three dimensional portion;

defining a first attachment line on said two dimensional portion;

generating a three dimensional transition portion wherein said transition portion includes a second attachment region corresponding to said first attachment region and a second attachment line corresponding to said first attachment line;

combining said three dimensional portion and said transition portion along said corresponding first and second attachment regions; and combining said two dimensional portion and said transition portion along said corresponding first and second attachment lines.

3. A graphics display method according to claim 2 wherein said first and second attachment regions each comprise corresponding polygons.

4. A graphics display method according to claim 2 wherein said first and second attachment lines are linear.

5. A graphics display method according to claim 2 wherein said first attachment line defines a boundary for a transition region of said two dimensional portion and wherein pixels from said two dimensional transition region are mapped onto said three dimensional transition portion.

6. A graphics display method according to claim 5 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

7. A graphics display method according to claim 6 wherein each of said polygons of said first and second pluralities comprises a triangle.

8. A graphics display method for displaying a graphic object, said graphics display method comprising the steps of:

representing in a graphics processor, a three dimensional portion of said graphic object;

representing in said graphics processor, a two dimensional portion of said graphic object;

combining in said graphics processor, said three dimensional portion and said two dimensional portion to form said graphic object having two dimensional and three dimensional portions wherein said combining step comprises defining a first three dimensional attachment region on said three dimensional portion, defining a first two dimensional attachment line on said two dimensional portion, generating a three dimensional transition portion wherein said transition portion includes a second three dimensional attachment region corresponding to said first three dimensional attachment region and a second two dimensional attachment line corresponding to said first two dimensional attachment line, combining said three dimensional portion and said transition portion along said corresponding first and second three dimensional attachment regions, and combining said two dimensional portion and said transition portion along said corresponding first and second two dimensional attachment lines; and displaying said graphic object having two dimensional and three dimensional portions on a two dimensional display.

9. A graphics display method according to claim 8 wherein said first two dimensional attachment line defines a boundary for a transition region of said two dimensional portion and wherein pixels from said two dimensional transition region are mapped onto said three dimensional transition portion.

10. A graphics display method according to claim 9 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

11. A graphics display method for displaying a graphic object, said graphics display method comprising the steps of:

representing in a graphics processor, a three dimensional portion of said graphic object wherein said three dimensional portion includes a first attachment region;

representing in said graphics processor, a two dimensional portion of said graphic object wherein said two dimensional portion includes a first attachment line;

generating in said graphics processor, a three dimensional transition portion wherein said transition portion includes a second attachment region corresponding to said first attachment region and a second attachment line corresponding to said first attachment line;

combining in said graphics processor, said three dimensional portion and said transition portion along said corresponding first and second attachment regions;

combining in said graphics processor, said two dimensional portion and said transition portion along said corresponding first and second attachment lines; and displaying said graphic object on a two dimensional display.

12. A method according to claim 11 further comprising the step of transferring movement of said three dimensional portion to said two dimensional portion.

13. A method according to claim 12:

wherein said three dimensional portion is defined in three dimensional space so that different views of said three dimensional portion can be displayed from different angles;

wherein said two dimensional portion is defined in two dimensional space so that only one view of said two-dimension portion can be displayed; and wherein said displaying step comprises displaying a first view of said composite graphic object on said two dimensional display wherein said three dimensional portion is displayed from a first angle, and displaying a second view of said composite graphic object on said two dimensional display wherein said three dimensional portion is displayed from a second angle.

14. A graphics display method according to claim 11 wherein said first and second attachment regions each comprise corresponding polygons.

15. A graphics display method according to claim 11 wherein said first and second attachment lines are linear.

16. A graphics display method according to claim 11 wherein said first attachment line defines a boundary for a transition region of said two dimensional portion and wherein pixels from said two dimensional transition region are mapped onto said three dimensional transition portion.

17. A graphics display method according to claim 16 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

18. A graphics display method according to claim 17 wherein each of said polygons of said first and second pluralities comprises a triangle.

19. A graphics display system for animating a composite graphic object on a two dimensional display, said system comprising:
   means for representing a three dimensional portion of said composite graphic object wherein said three dimensional portion is defined in three dimensional space so that different views of said three dimensional portion can be displayed from different angles;
   means for representing a two dimensional portion of said composite graphic object wherein said two dimensional portion is defined in two dimensional space so that only one view of said two-dimension portion can be displayed;
   means for combining said three dimensional portion and said two dimensional portion to form said composite graphic object; and
   means for rendering a first view of said composite graphic object on said two dimensional graphics display wherein said three dimensional portion is displayed from a first angle, and for rendering a second view of said composite graphic object on said two dimensional display wherein said three dimensional portion is displayed from a second angle and wherein movement of said three dimensional portion is transferred to said two dimensional portion such that movement of said two dimensional portion mimics movement of said three dimensional portion.

20. A graphics display system according to claim 19 wherein said combining means further comprises:
   means for defining a first attachment region on said three dimensional portion;
   means for defining a first attachment line on said two dimensional portion;
   means for generating a three dimensional transition portion wherein said transition portion includes a second attachment region corresponding to said first attachment region and a second attachment line corresponding to said first attachment line; and
   means for combining said three dimensional portion and said transition portion along said corresponding first and second attachment regions and for combining said two dimensional portion and said transition portion along said corresponding first and second attachment lines.

21. A graphics display system according to claim 20 wherein said first and second attachment regions each comprise corresponding polygons.

22. A graphics display system according to claim 20 wherein said first and second attachment lines are linear.

23. A graphics display system according to claim 20 wherein said first attachment line defines a boundary for a transition region of said two dimensional portion and wherein pixels from said two dimensional transition region are mapped onto said three dimensional transition portion.

24. A graphics display system according to claim 23 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

25. A graphics display system according to claim 24 wherein each of said polygons of said first and second pluralities comprises a triangle.

26. A graphics display system for displaying a graphic object on a two dimensional display, said system comprising:
   means for representing a three dimensional portion of said graphic object;
   means for representing a two dimensional portion of said graphic object;
   means for combining said three dimensional portion and said two dimensional portion to form said graphic object having two dimensional and three dimensional portions wherein said combining means further comprises
      means for defining a first three dimensional attachment region on said three dimensional portions,
      means for defining a first two dimensional attachment line on said two dimensional portion,
      means for generating a three dimensional transition portion wherein said transition portion includes a second three dimensional attachment region corresponding to said first three dimensional attachment region and a second two dimensional attachment line corresponding to said first two dimensional attachment line, and
      means for combining said three dimensional portion and said transition portion along said corresponding first and second three dimensional attachment regions and for combining said two dimensional portion and said transition portion along said corresponding first and second two dimensional attachment lines; and
   means for rendering said graphic object having two dimensional and three dimensional portions on said two dimensional display.

27. A graphics display system according to claim 26 wherein said first two dimensional attachment line defines a boundary for a transition region of said two dimensional portion and wherein pixels from said two dimensional transition region are mapped onto said three dimensional transition portion.

28. A graphics display system according to claim 27 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

29. A graphics display system for displaying a graphic object on a two dimensional graphics display, said system comprising:

means for representing a three dimensional portion of said graphic object wherein said three dimensional portion includes a first attachment region;

means for representing a two dimensional portion of said graphic object wherein said two dimensional portion includes a first attachment line;

means for generating a three dimensional transition portion wherein said transition portion includes a second attachment region corresponding to said first attachment region and a second attachment line corresponding to said first attachment line;

means for combining said three dimensional portion and said transition portion along said corresponding first and second attachment regions and for combining in said graphics processor, said two dimensional portion and said transition portion along said corresponding first and second attachment lines; and means for rendering said graphic object on said two dimensional display.

30. A graphics display system according to claim 29 further comprising means for transferring movement of said three dimensional portion to said two dimensional portion.

31. A graphics display system according to claim 30:

wherein said three dimensional portion is defined in three dimensional space so that different views of said three dimensional portion can be displayed from different angles;

wherein said two dimensional portion is defined in two dimensional space so that only one view of said two-dimension portion can be displayed; and wherein said rendering means comprises means for displaying a first view of said composite graphic object on said two dimensional display wherein said three dimensional portion is displayed from a first angle, and for displaying a second view of said composite graphic object on said two dimensional display wherein said three dimensional portion is displayed from a second angle.

32. A graphics display system according to claim 29 wherein said first and second attachment regions each comprise corresponding polygons.

33. A graphics display system according to claim 29 wherein said first and second attachment lines are linear.

34. A graphics display system according to claim 29 wherein said first attachment line defines a boundary for a transition region of said two dimensional portion and wherein pixels from said two dimensional transition region are mapped onto said three dimensional transition portion.

35. A graphics display system according to claim 34 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

36. A graphics display system according to claim 35 wherein each of said polygons of said first and second pluralities comprises a triangle.

37. A computer program product comprising a computer-readable storage medium having computer-readable program code means embodied in said medium, said computer-readable program code means comprising:

first computer-readable program code means for representing a three dimensional portion of said composite graphic object wherein said three dimensional portion is defined in three dimensional space so that different views of said three dimensional portion can be displayed from different angles;

second computer-readable program code means for representing a two dimensional portion of said composite graphic object wherein said two dimensional portion is defined in two dimensional space so that only one view of said two-dimension portion can be displayed;

third computer-readable program code means for combining said three dimensional portion and said two dimensional portion to form said composite graphic object;

fourth computer-readable program code means for rendering a first view of said composite graphic object wherein said three dimensional portion is displayed from a first angle; and fifth computer-readable program code means for rendering a second view of said composite graphic object wherein said three dimensional portion is displayed from a second angle and wherein movement of said three dimensional portion is transferred to said two dimensional portion such that movement of said two dimensional portion mimics movement of said three dimensional portion.

38. A computer program product according to claim 37 wherein said third computer-readable program code means includes:

means for defining a first attachment region on said three dimensional portion;

means for defining a first attachment line on said two dimensional portion;

means for generating a three dimensional transition portion wherein said transition portion includes a second attachment region corresponding to said first attachment region and a second attachment line corresponding to said first attachment line;

means for combining said three dimensional portion and said transition portion along said corresponding first and second attachment regions; and means for combining said two dimensional portion and said transition portion along said corresponding first and second attachment lines.

39. A computer program product according to claim 38 wherein said first and second attachment regions each comprise corresponding polygons.

40. A computer program product according to claim 38 wherein said first and second attachment lines are linear.

41. A computer program product according to claim 38 wherein said first attachment line defines a boundary for a transition region of said two dimensional portion and wherein pixels from said two dimensional transition region are mapped onto said three dimensional transition portion.

42. A computer program product according to claim 41 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

43. A computer program product according to claim 42 wherein each of said polygons of said first and second pluralities comprises a triangle.

44. A computer program product comprising a computer-readable storage medium having computer-readable program code means embodied in said medium, said computer-readable program code means comprising:

first computer-readable program code means for representing a three dimensional portion of said graphic object;

second computer-readable program code means for representing a two dimensional portion of said graphic object;

third computer-readable program code means for combining said three dimensional portion and said two dimensional portion to form said graphic object having two dimensional and three dimensional portions wherein said third computer-readable program code means includes means for defining a first three dimensional attachment region on said three dimensional portion, means for defining a first two dimensional attachment line on said two dimensional portion, means for generating a three dimensional transition portion wherein said transition portion includes a second three dimensional attachment region corresponding to said first three dimensional attachment region and a second two dimensional attachment line corresponding to said first two dimensional attachment line, means for combining said three dimensional portion and said transition portion along said corresponding first and second three dimensional attachment regions, and means for combining said two dimensional portion and said transition portion along said corresponding first and second two dimensional attachment lines; and fourth computer-readable program code means for rendering said graphic object having two dimensional and three dimensional portions.

45. A computer program product according to claim 44 wherein said first two dimensional attachment line defines a boundary for a transition region of said two dimensional portion and wherein pixels from said two dimensional transition region are mapped onto said three dimensional transition portion.

46. A computer program product according to claim 45 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

47. A computer program product comprising a computer-readable storage medium having computer-readable program code means embodied in said medium, said computer-readable program code means comprising:

first computer-readable program code means for representing a three dimensional portion of said graphic object wherein said three dimensional portion includes a first attachment region;

second computer-readable program code means for representing a two dimensional portion of said graphic object wherein said two dimensional portion includes a first attachment line;

third computer-readable program code means for generating a three dimensional transition portion wherein said transition portion includes a second attachment region corresponding to said first attachment region and a second attachment line corresponding to said first attachment line;

fourth computer-readable program code means for combining said three dimensional portion and said transition portion along said corresponding first and second attachment regions;

fifth computer-readable program code means for combining said two dimensional portion and said transition portion along said corresponding first and second attachment lines; and sixth computer-readable program code means for rendering said graphic object.

48. A computer program product according to claim 47 wherein said sixth computer-readable program code means includes means for transferring movement of said three dimensional portion to said two dimensional portion.

49. A computer program product according to claim 48:

wherein said three dimensional portion is defined in three dimensional space so that different views of said three dimensional portion can be displayed from different angles;

wherein said two dimensional portion is defined in two dimensional space so that only one view of said two-dimension portion can be displayed; and wherein said displaying means comprises means for displaying a first view of said composite graphic object on said two dimensional display wherein said three dimensional portion is displayed from a first angle, and means for displaying a second view of said composite graphic object on said two dimensional display wherein said three dimensional portion is displayed from a second angle.

50. A computer program product according to claim 47 wherein said first and second attachment regions each comprise corresponding polygons.

51. A computer program product according to claim 47 wherein said first and second attachment lines are linear.

52. A computer program product according to claim 47 wherein said first attachment line defines a boundary for a transition region of said two dimensional portion and wherein pixels from said two dimensional transition region are mapped onto said three dimensional transition portion.

53. A computer program product according to claim 52 wherein said three dimensional transition portion is divided into a first plurality of polygons, wherein said two dimensional transition portion is divided into a second plurality of polygons corresponding to said first plurality of polygons, and wherein pixels from each of said second plurality of polygons are mapped onto respective ones of said first plurality of polygons.

54. A computer program product according to claim 53 wherein each of said polygons of said first and second pluralities comprises a triangle.

* * * * *

UNITED STATES PATENT AND TRADEMARK OFFICE
CERTIFICATE OF CORRECTION

PATENT NO. : 5,945,999
DATED : August 31, 1999
INVENTOR(S) : Freedman, et. al.

It is certified that error appears in the above-identified patent and that said Letters Patent is hereby corrected as shown below:

Claim 26, Column 14, line 34 should read:
"region on said three dimensional portion,"

Signed and Sealed this

Thirtieth Day of May, 2000

Attest:

Q. TODD DICKINSON

Attesting Officer

Director of Patents and Trademarks